Feb. 25, 1964 M. L. STEINER 3,122,206
DEVICE FOR OBTAINING A SEAL IN A GAS OR OIL WELL
Filed Nov. 2, 1960 2 Sheets-Sheet 1

INVENTOR.
Maurice L. Steiner
BY
Christy, Parmelee Strickland
His Attorneys

INVENTOR.
Maurice L. Steiner
BY
Christy, Parmelee
Strickland
His Attorneys

United States Patent Office 3,122,206
Patented Feb. 25, 1964

3,122,206
DEVICE FOR OBTAINING A SEAL IN A
GAS OR OIL WELL
Maurice L. Steiner, Alameda Road, Butler, Pa.
Filed Nov. 2, 1960, Ser. No. 66,740
6 Claims. (Cl. 166—168)

This invention relates to the treatment of gas or oil wells, and particularly to a novel method and device for preparing the well for the fracturing of the producing sand by fluid pressure.

In oil and gas wells, and particularly in gas wells, it is common practice to treat the producing sand or rock formation by hydraulic fracturing, which includes injecting a liquid under pressure into the producing stratum at the bottom of the well. The resulting fractures radiate in an area from the bottom of the well and enable the gas or oil to flow more freely to the well. This practice, which is known in the industry as "hydrofracting," may be performed on new wells at the time of completion when the relation of rate of flow to supply pressure warrants it, and in producing wells when the rate of production falls off to a level where such procedure is indicated.

There is a well tubing that extends from above ground level to the producing formation, and its lower end is perforated for the withdrawal of oil or gas through the well. In fracturing the well, a packer on the tubing is set at a level in the well close to the top of the producing formation. Since the pressures used to produce fracturing may be several thousand pounds per square inch, the packer alone is insufficient to resist the pressure, and it is customary to introduce a mass of flowable mix of Portland cement and water into the well immediately above the packer. This mixture is allowed to thoroughly set before the hydrofracting pressure is applied, and the length of time is increased with the amount of cement used. Having set, the mixture resists upward pressure against the packer.

The depth of the well may vary from around 1,000 feet to several thousand feet, wells in the Western Pennsylvania fields which are processed in this way generally ranging between 1,500 and 4,000 feet in depth.

When cement mixture is simply dumped into the well without any control, the result is quite unpredictable. The mixture will, to a large extent, adhere to the sides of the well and to the other surface of the tubing, thereby greatly diminishing the amount which ultimately reaches the desired location above the packer. It is also quite possible for the cement to bridge across the opening part way down and never rest on the packer where it is required. In order to be assured that enough sealing mixture is provided above the packer, cement may be used in such an amount that its weight is more than the packer will sustain. It may accumulate to a depth of 100 feet, and a mass of this depth requires considerable time to set. Also, it is not practical to reduce the amount of cement required by using sand, with the cement in the present situation, because the sand will segregate out as the free-falling mix drops great distances.

The present invention has for its principal object to provide a device and method for use in a gas or oil well for the controlled introduction of sealing material into the well immediately above the packer to seal off the well above the packer and back up the packer against upward pressure.

Another object of my invention is to reduce the time and material used in the operation of cementing in the packer.

Another object of my invention is to provide a method and device of the above type for depositing cement directly on the packer, which thereby eliminates the need for using excessive amounts of sealing compound, and protect the packer from the impact of a free-falling mass of cement.

These and other objects and advantages are secured by my invention as will appear from the following description when taken in connection with the following drawings, wherein.

Figure 1:
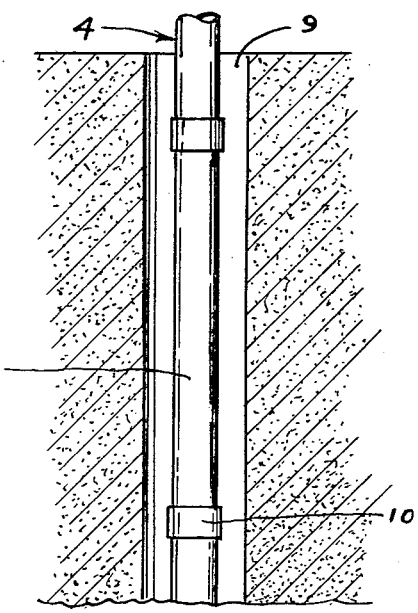
FIG. 1 is a schematic view illustrating a typical well with sealing material above the packer, the view being partly in vertical section and partly in elevation.

Referring to the drawings, there is provided a special receptacle 1 to be charged with a flowable slurry of cement and water mixture or other sealing compound, and then lowered into the well around the tubing onto the top of an expansible sealing packer 2 that is customarily provided in operations of this kind. This packer 2, of known construction, is set just above the producing formation, designated A in FIG. 1 so as to establish a fluid-tight seal above the producing stratum, and above the perforate lower section 3 of the well tubing 4 below the packer 2. Contact of the bottom of the receptacle 1 with the top of the packer 2 operates the device as hereinafter explained, to open and deposit the cement slurry contained thereon in the exact required location at the top of the packer. The bottom of the device 1 when opened is locked open so that, as the device is then raised, the slurry continues to pour out of the receptacle until the device is emptied. This slurry, when hardened, will reinforce the packer so that the high fluid prsesure used in the ensuing hydrofracting treatment will not rupture the seal effected by the packer.

As shown in the drawings, the cement pouring device or receptacle 1 comprises an outer cylindrical shell 5 and an inner cylindrical shell 6 which are immovably joined together in coaxial relation by a plurality of evenly-distributed webs or spacers 7 so as to define an annular chamber 8 between 5 and 6. The shell 5 is of such diameter as will permit the device 1 to be lowered into a well 9 while the inner shell 6 is of such internal diameter as will permit the device to pass readily over the couplings 10 of the sectional well tubing. An inwardly-turned annular flange 12 is formed on the bottom of the outer shell 5 so as to provide a seat at the bottom of the chamber 8, but the flange terminates short of meeting with the inner shell 6. The inner edge of this flange 12 is spaced away from the periphery of the inner shell 6 so as to provide an annular opening 13 which serves as a port through which cement slurry or other flowable material may be discharged from the chamber 8 into the area above the packer 2.

Figure 5:
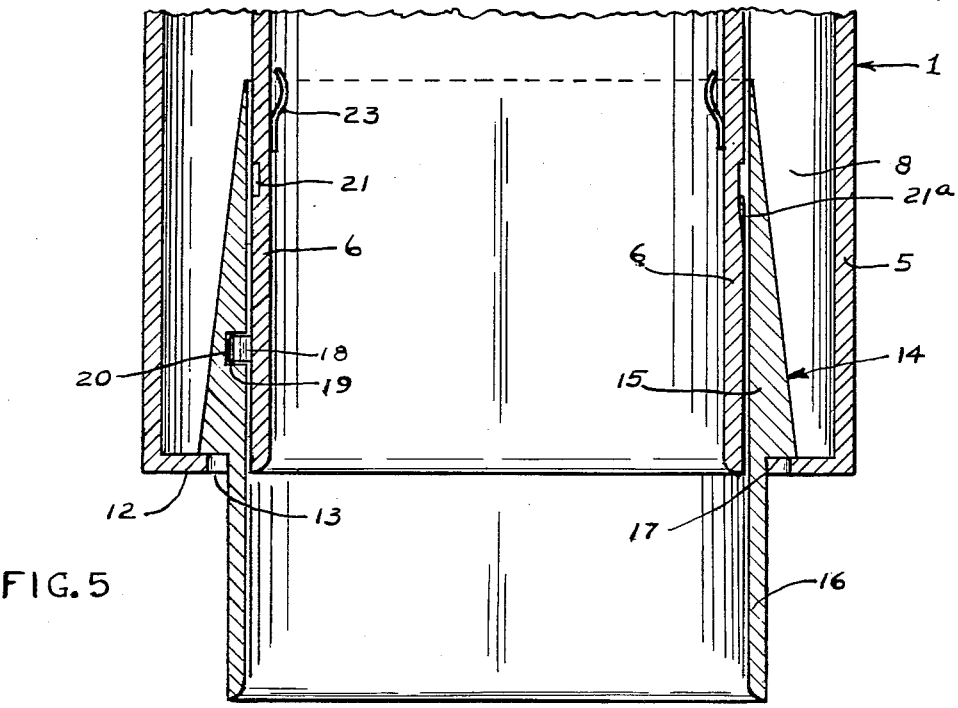
FIG. 5 is a fragmentary view, mainly in vertical section, in the plane of line V—V of FIG. 2, but on a larger scale and with the dart valve closed.

Slidably and rotatably fitted about the inner member 6 and within the opening 13 for controlling the discharge of cement slurry from the chamber 8 is a valve member 14, which is called a "dart" in the parlance of the drilling industry. As shown in FIG. 5, the annular valve member 14 resembles in vertical cross section the contour of a dart, having an upper part 15 of upwardly-diminishing outside diameter, and a cylindrical skirt section 16 having its inner surface constituting a smooth continuation of the interior of the upper portion 15, this skirt constituting a valve-operating extension. Intermediate the ends of the member 14 at the juncture of parts 15 and 16 there is an external shoulder that overhangs and normally seats on the flange 12, as best seen in FIG. 5, thereby serving to close the annular outlet port 13. In this position skirt 16 projects below the end of the receptacle a distance at least as great as is required for moving the dart valve from its closed to its open position.

Figure 6:
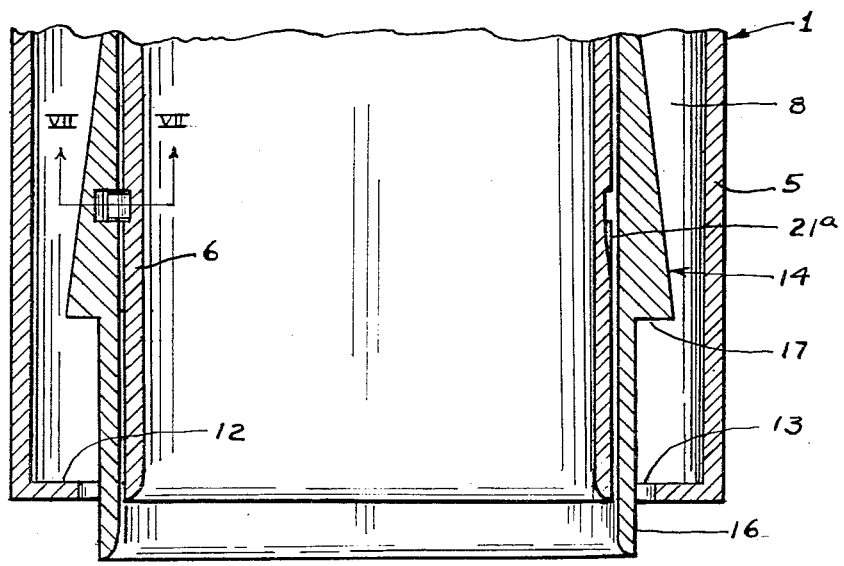
FIG. 6 is a view similar to FIG. 5 with the dart valve in its open position.

When the receptacle, filled with flowable sealing compound or slurry, is lowered into the well, the skirt 13 will first contact the packer, and its further downward movement will be arrested, but the weight of the load and of the receptacle will cause the receptacle to continue to move down relative to the dart valve 14 to the position shown in FIG. 6, moving the parts to the position shown in FIG. 6. The lower end of the dart 14 and the lower end of the shell 6 are chamfered on their inner peripheries at 14a and 6a respectively, to facilitate the device riding over the couplings 10.

Figure 3:
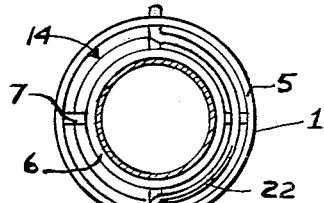
FIG. 3 is a plan view, in outline, of the device shown in FIG. 2, the tubing being in horizontal section.
Figure 2:
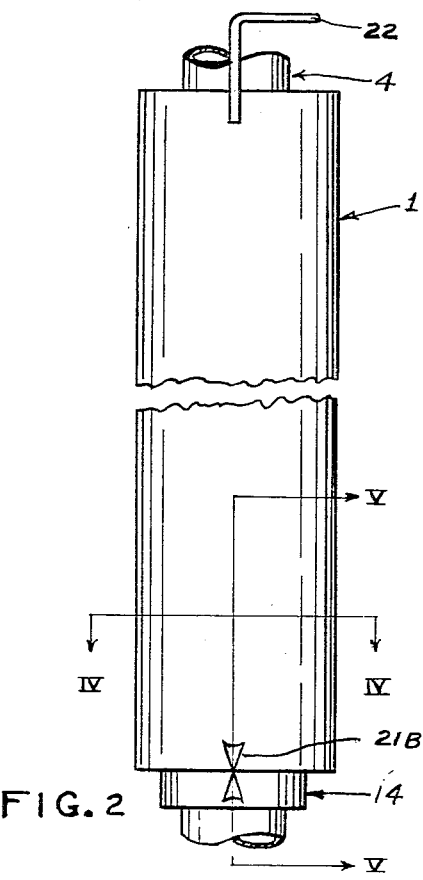
FIG. 2 is a side elevation, in outline, of a cement pouring device embodying my invention, showing it in position about a well tubing.
Figure 4:
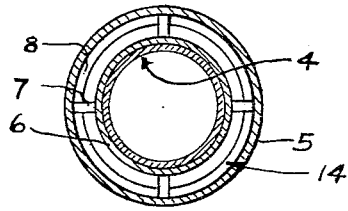
FIG. 4 is a transverse horizontal section in the plane of line IV—IV of FIG. 2.
Figure 7:
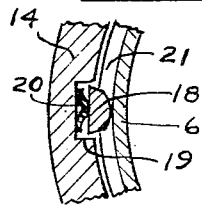
FIG. 7 is a fragmentary detail view, mainly in horizontal section, taken in the plane of line VII—VII of FIG. 6, showing the spring-actuated detent.

At a level intermediate the top and bottom of the upper section 13 of the dart 14, a detent 18 is slidably mounted in a recess 19 formed in the inner surface of the dart. As best seen in FIG. 7, this detent 18 is urged radially inward toward the inner member 6 by an arcuate flat spring 20. An annular groove 21 is formed in the outer periphery of the inner shell 6 into which the detent 18 is projected by the spring 20 when the dart or valve member 14 has been moved to its upper position shown in FIG. 6. As shown in FIGS. 5 and 6, the groove 21 at one position around its perimeter has an inclined camming surface 21a at its lower edge, so that if the dart valve is rotated to bring the detent to this position, the valve may be pulled down relative to the receptacle and the detent retracted for reuse. Matched markings, as indicated at 21B in FIG. 2, will indicate when the detent and camming surface are in position to permit such relative movement.

The receptacle 1 is provided at the top with a bail 22 secured to the outer shell 5 by welding or other suitable means (not shown), to which bail cables may be attached for lowering and raising the receptacle 1 in the well 9. The interior wall of the inner shell 6 is provided with spring fingers 23 designed to bear lightly against the exterior of the tubing 11 to restrain the receptacle 1 against free rotation about the tubing 11, and thereby prevent the cable attached to the bail 22 from becoming wrapped around the tubing.

In operation, the receptacle 1 is suspended at the top of the well by means of cables (not shown) attached to the bail 22. When the device is thus suspended, the dart or valve member 14 will be in its normal, closed position in which it is shown in FIG. 5. In this position, shoulders 17 of the dart 14 will overlap the flange 12, thereby covering the opening 13. The cement slurry or other flowable sealing material is poured into the open top of the annular chamber 8 until it is filled. Typically the receptacle may be around twenty to thirty feet in length, thereby holding enough of the sealing mix to fill the well above the packer to nearly the same depth. In a well slightly more than six inches in diameter with about a two-inch well tubing, one sack of Portland cement slurry will usually be adequate.

The cement may be a slurry composed of Portland cement and water, or an air-hardening plastic having a strong adhesion characteristic toward rock. As previously mentioned, a suitable slurry in a sufficient amount may be obtained by mixing one sack of Portland cement with enough water to make it fluid.

The cement pouring device or vessel 1, after being charged with the sealing material, is then lowered down the hole until the device rests on the packer 2. When the bottom of the section 16 of the dart 14 strikes the packer 2, the descent of the dart will be stopped while the body of the receptacle will continue to move downward relative to the dart. This relative movement will carry the flange 12 away from the shoulder 17 on the dart, thereby uncovering the opening 13 to permit cement in chamber 8 to flow to the area below the flange 12. At the same time the annular groove 21 in the inner shell 6 will be carried downward to horizontal alignment with the spring detent 18 in the dart 14. The detent 18 will then project into the groove 21 to lock the dart and the shell assembly against relative endwise movement. Then the device is gradually lifted from the top of the packer and the flowable cement in chamber 8 will pour out the opening 13 into the well, uniformly locating the cement at and above the packer 22, where it will set and harden to resist upward pressure to which the packer is subsequently subjected.

Since all of the slurry or sealing compound is introduced by a controlled accurately-located placement procedure, without impact against the top of the packer, and without loss or contamination because of much of the material clinging to the interior of the well or to the tubing, the exact amount of cement can be predetermined and the depth of the seal above the packer predetermined, and its curing time held to a minimum. The tool may even be moved up and down to tamp the sealing material after it is placed, should this be desirable. The rate of release of the confined mass of sealing material will be controlled by its fluidity, the dimensions of the annular port 13, and the rate at which the receptacle is raised after the dart valve is opened at the top of the packer since the hydrostatic pressure and fluidity of the sealing material may be such that the material will discharge only as the receptacle is raised.

In addition to the specific use above described, the device has utility for other purposes and in other fields than oil and gas wells. For example, in many wells the packer is set below the well casing where the diameter of the well above the packer may be enlarged. The device may be lowered into the well after the cement has hardened to determine the actual level of the cement above the packer as compared to what the estimated level should be, and thereby determine if this condition exists. There is sometimes uncertainty as to the real location of the packer, and the device may be used as a sounding device to determine the exact depth of the packer below the surface. In coal mining, there are conditions where a hole is drilled from the surface into the mine and a tube set in the hole with a packer, after which cement is introduced above the packer, the tube perhaps being a vent, or serving as a pipe for the introduction of a fire-extinguishing or sealing fluid into the mine.

While I have shown and described one specific embodiment of my invention and the manner of practicing the same, various changes and modifications may be made in the construction of the device within the contemplation of my invention as defined in the following claims.

I claim:

1. Apparatus for the controlled placing of a sealing material immediately above a well packer and about the tubing in a well, which tubing extends through the packer to the top of the well, said apparatus comprising a receptacle having an inner cylindrical wall of a diameter sufficient to move up and down a well tubing with couplings therein, an outer wall concentric with the inner one and spaced therefrom to define an annular chamber, a valve means at the bottom of said annular chamber movable from a closed position where it closes the bottom of the chamber to an open position by relative axial movement of the valve means and the receptacle, and coacting means on the valve means and receptacle for latching the valve means in open position when such relative axial movement has been effected.

2. Apparatus for the controlled placing of a sealing material immediately above a well packer and about the tubing in a well, which tubing extends through the packer to the top of the well, said apparatus comprising a receptacle having an inner cylindrical wall of a diameter sufficient to move up and down a well tubing with couplings therein, an outer wall concentric with the inner one and spaced therefrom to define an annular chamber, a valve means at the bottom of said annular chamber movable from a closed position where it closes the bottom of the chamber to an open position by relative axial movement of the valve means and the receptacle, said valve means having a downwardly-projecting operating extension extending below the bottom of the receptacle and through which such relative axial movement may be effected, and coacting means on the valve means and receptacle for latching the valve means in open position when such relative axial movement has been effected.

3. A liquid cement pouring vessel of the class described comprising an outer cylindrical shell and an inner cylindrical shell rigidly connected to each other in coaxial relation to form an annular chamber for encircling a well tubing within a well, valve means mounted at the bottom of said vessel normally closing the bottom of said chamber and operable when carried into contact with a stationary sealing packer element at the bottom of said well to open the bottom of said chamber, whereby flowable sealing material in the vessel may then flow out of the annular chamber into the well, and coacting means on the valve means and vessel for latching the valve means in open position when such relative axial movement has been effected.

4. A liquid cement pouring vessel of the class described comprising an outer cylindrical shell and an inner cylindrical shell rigidly connected with each other in coaxial relation to form an annular chamber and designed to be positioned around and movable vertically along a well tubing, an annular flange portion on the bottom of one of said shells confronting but spaced from the other of said shells so as to partially close the bottom of said chamber and provide a downwardly-opening annular port, through the bottom of the vessel valve means interposed between said flange and said other shell having a normal position where it engages said flange for closing the bottom of said chamber and movable relative to said shells to a position above the flange where material may flow from the chamber between the flange and the shell which it confronts, an operating extension mounted on said valve means operable when carried into contact with an external stationary element to actuate said valve means to its open position, and coacting means on the valve means and vessel for latching the valve means in open position when such relative axial movement has been effected.

5. A cement pouring vessel of the class described comprising an outer cylindrical shell and an inner cylindrical shell rigidly connected to each other in coaxial relation to form an annular chamber, said vessel being designed to encircle and move vertically along a well tubing within the bored well, valve means mounted on said shells normally closing the bottom of said chamber and operable to open said bottom when carried into contact with a stationary packer on the tubing adjacent the bottom of the well, said valve means comprising an annular seat member formed on the bottom of one shell and extending toward the other shell and forming between it and the other shell a downwardly-opening annular port in the bottom of the vessel, an annular valve member disposed in said chamber normally seating on said seat member, the annular valve having a skirt portion extending between the seat member and the other shell to the exterior beneath said member for contact with said packer, and coacting means on the valve means and vessel for latching the valve means in open position when such relative axial movement has been effected.

6. A cement pouring device of the class described comprising a receptacle having an outer cylindrical shell and an inner cylindrical shell rigidly connected together in coaxial relation to form between them an annular chamber, the internal diameter of the inner shell being larger than the maximum diameter of the well tubing whereby the receptacle may be placed about the well tubing, the outside diameter of the outer vessel being less than the diameter of the well into which the device is to be used, valve means mounted at the bottom of said shells having a normal position closing the bottom of said chamber and movable to an open position in which flowable material in the annular chamber may flow therefrom, said valve means comprising an annular seat formed at the bottom of one shell and extending toward, but spaced from, the other shell to form an annular port in and at the bottom of the receptacle, an annular valve member slidably mounted on said other shell which in the closed position engages the seat and in the open position is above the seat, and manually releasable detent means operable to latch said valve means in its open position, said annular port allowing material to flow directly from the bottom of the receptacle when the valve is open into the well-space below it.

References Cited in the file of this patent
UNITED STATES PATENTS

| | | |
|---|---|---|
| 1,450,485 | Cousins | Apr. 3, 1923 |
| 1,542,776 | Ingram | June 16, 1925 |
| 2,821,255 | Spearow | Jan. 28, 1958 |
| 2,896,722 | Barnes | July 28, 1959 |